United States Patent
Cottone et al.

(10) Patent No.: US 7,210,280 B2
(45) Date of Patent: May 1, 2007

(54) SYSTEM AND METHOD FOR LOADING A CARGO SPACE WITH PIECE GOODS

(75) Inventors: Norbert Cottone, Zusmarshausen (DE); Florian Simons, Stuttgart (DE)

(73) Assignee: KUKA InnoTec GmbH (DE)

( * ) Notice: Subject to any disclaimer, the term of this patent is extended or adjusted under 35 U.S.C. 154(b) by 0 days.

(21) Appl. No.: 10/529,997

(22) PCT Filed: Sep. 30, 2003

(86) PCT No.: PCT/EP03/10818

§ 371 (c)(1),
(2), (4) Date: Mar. 31, 2005

(87) PCT Pub. No.: WO2004/035426

PCT Pub. Date: Apr. 29, 2004

(65) Prior Publication Data

US 2006/0006047 A1    Jan. 12, 2006

(30) Foreign Application Priority Data

Oct. 2, 2002  (DE)  ................................. 102 46 285

(51) Int. Cl.
*B65G 1/24* (2006.01)
*B65G 13/20* (2006.01)
*B65G 63/02* (2006.01)

(52) U.S. Cl. .................... 53/530; 198/426; 198/431; 198/419.1; 198/418.5; 198/418.7; 198/373; 198/406; 198/412; 198/465.1; 198/468.6; 198/468.8; 198/589; 198/418.6; 414/788; 414/788.5; 414/788.6; 414/789.3; 414/790; 414/790.5; 414/791.1; 414/792.4; 414/792.7; 414/794.7; 414/794.8; 53/439

(58) Field of Classification Search ................ 414/788, 414/790, 788.5, 788.6, 789.3, 790.5, 791.1, 414/792.4, 792.7, 794.7, 794.8; 198/418.6, 198/426, 431, 419.1, 418.5, 418.7, 373, 406, 198/412, 465.1, 468.6, 468.8, 589; 53/439, 53/530

See application file for complete search history.

(56) References Cited

U.S. PATENT DOCUMENTS 3,904,024 A * 9/1975 Smith ...................... 414/788.7
4,264,253 A * 4/1981 Kennison ................. 414/789.5
4,892,458 A * 1/1990 Proulx ..................... 414/791.6
5,074,744 A * 12/1991 Mastak .................... 414/791.7

(Continued)

FOREIGN PATENT DOCUMENTS

DE         OE 340 316        12/1977

(Continued)

*Primary Examiner*—Gene O. Crawford
*Assistant Examiner*—Leslie A. Nicholson, III
(74) *Attorney, Agent, or Firm*—McGlew & Tuttle, PC

(57) ABSTRACT

A machining system and unit, especially a welding cell, is provided for use for the machining of workpieces (2), especially body parts of vehicles. The machining system has one or more machining stations (15, 16) with robots (18, 19, 20) and at least one rotation or turning station (5), which has at least two work stations (6, 7) for carrying out different operations simultaneously. The turning station (5) has at least two multiaxially movable turning units (8, 9) arranged next to one another with said gripping tools (11, 12, 13). The working areas (10) intersect each other at the work stations (6, 7).

21 Claims, 7 Drawing Sheets

U.S. PATENT DOCUMENTS 5,099,634 A     3/1992  Treloar
5,201,626 A     4/1993  Hansen
5,459,979 A  *  10/1995 Tommasi .................... 53/439

FOREIGN PATENT DOCUMENTS

| | | |
|---|---|---|
| DE | 689 13 047 | 9/1994 |
| DE | 197 19 748 | 11/1998 |
| DE | 197 40 156 | 3/1999 |
| GB | 1 523 939 | 9/1978 |
| JP | 62211213 A  * | 9/1987 |
| RU | 1782894 | 12/1992 |

* cited by examiner

SYSTEM AND METHOD FOR LOADING A CARGO SPACE WITH PIECE GOODS

CROSS REFERENCE TO RELATED APPLICATIONS

This application is a United States National Phase application of International Application PCT/EP03/10818 filed Sep. 30, 2003 and claims the benefit of priority under 35 U.S.C. § 119 of German Application DE 102 46 285.2 filed Oct. 2, 2002, the entire contents of which are incorporated herein by reference.

FIELD OF THE INVENTION

The invention relates to an installation and a method for loading a loading space with piece goods preferably having an at least partly deformable piece good surface, with a feed device on which the piece goods can be singly fed in, as well as a transfer device onto which the piece goods can be transferred from the feed device and by means of which the piece goods can be brought into the interior of the loading space.

BACKGROUND OF THE INVENTION

The industrial dispatch of piece goods by truck, railway, ship or aircraft provides for the use of containers, which are to be loaded and unloaded with respect to the particular piece goods to be transported. Typically such containers have a parallelepipedic loading space volume, which is conventionally accessible from a single, openable loading space side for loading and unloading. However, particular significance is attached to the loading process, particularly as this determines the degree of filling with which the container is loaded with a plurality of individual piece goods and which ultimately decisively establishes the economics of the transportation. There is also a special loading plan determining the loading or stacking pattern for the piece goods within the container for ensuring the transportation safety of the individual piece goods and also that of the entire container. Thus, loose piece goods within the container dramatically increase the safety of the overall transportation.

Having said this the remaining statements mainly relate to the loading of piece goods with a flexible or deformable piece good surface, such as is e.g. the case with piece good-filled sacks or bags, such as e.g. those for cereals, sand, salt, spices, sugar, etc. However, the subsequently described aspects and measures can also relate to piece goods with fixed piece good surfaces, such as e.g. packages, even though to a somewhat limited extent.

The loading of sack-like piece goods into container loading spaces normally takes place manually. It is admittedly known to use a telescopic belt conveyor which projects into a loading space and by means of which the individual piece goods can be singly transferred into said loading space, but it is still up to the person located in the loading space to deposit the incoming piece goods in accordance with a corresponding stacking pattern within the loading space. Apart from the in part very high dead weight of the individual piece goods, it is not possible with such a partially manual loading or only through the application of very high effort to stack piece goods to just below the loading space top or roof, particularly as the loading space height generally exceeds the manually accessible working height.

Completely automated loading systems with which the above described, multiside-closed containers can be loaded are not at present available. In addition, when using the at least partly automated loading procedures, as a result of the only very short time slot within which the loading process must be concluded, it is not possible to ensure the precise maintenance of the desired positions of the individual piece goods established on the basis of a predetermined loading pattern. As a result the necessary piece good quantity cannot be completely brought into the loading space in many cases. In particular on loading piece goods packed in sacks, on depositing the individual piece goods undefined geometrical shapes arise, which cause unused gaps within the stack-like piece good arrangement and consequently significantly reduce the degree of filling of the loading space.

To avoid the confined space conditions within the loading space during the loading process, in so-called two-stage loading processes there is a stack-like combining of a plurality of individual piece goods on loading pallets outside the loading space and they are subsequently brought as a whole into the loading space. In this case a palletizing robot is used for producing the piece good stack on the basis of a predetermined palletizing diagram. In order to subsequently bring the three-dimensional palletizing diagram into the loading space, it is necessary to have corresponding loading aids, e.g. in the form of so called Euro-pallets, which in this case remain within the loading space and therefore take up a not inconsiderable amount of space, which is to be avoided.

DE 197 19 748 C2 discloses a means for handling piece goods, particularly packages, for the loading and unloading of a loading space, as well as a corresponding method, in which the individual piece goods can be conveyed into and out of the loading space by means of a vertically adjustable conveyor. To the vertically adjustable conveyor is then connected a horizontally oriented conveying section, whose length corresponds to the loading space width, so that in planned manner the individual piece goods can be positioned for taking up or setting down at a random location within the loading space. The taking up or setting down of the individual piece goods from the horizontally oriented conveyor section takes place with the aid of a corresponding suction gripper device. The known means admittedly aims a tan optimum piece good utilization of the loading space volume, but said piece goods have a specific surface shape and are preferably seamlessly stackable on and over one another.

SUMMARY OF THE INVENTION

The problem of the invention is to provide an installation for loading piece goods into a loading space preferably having an at least partly deformable piece good surface, with a feed device on which the piece goods can be individually fed and a transfer device onto which the piece goods can be transferred from the feed device and by means of which the piece goods can be brought into the interior of the loading space and which is so further developed that the loading space can be filled between the piece goods preferably deposited in stack-like manner within the loading space. It must in particular be possible to convey and handle piece goods, whose piece good surface is at least partly flexible, such as e.g. sacks filled with bulk material, e.g. sand, cereal or sugar sacks, in such a way that on the basis of a predetermined loading plan, they can be deposited in space-optimized manner within the loading space with a view to avoiding the aforementioned gaps. It must also be ensured that the loading process takes place securely and safely in order to avoid damage or losses to the piece goods to be loaded. The loading time for the entire loading process is also to be reduced compared with known loading procedures.

The fundamental idea of the invention is a planned shaping or reorientation of the piece goods to be loaded before entering the loading space for further deposition. Shaping or reorientation takes place in such a way that the individual piece goods are brought into a geometrically compact, stack-like form, which is retained throughout the loading process until finally the individual piece goods are deposited within the loading space for forming a stack-like piece good arrangement within said loading space.

This makes it possible to significantly increase the degree of filling of the loading space filled with the individual piece goods. As a result of an automated transfer into the loading space of in part compressed, individual piece goods which are optimized as regards their degree of filling, no further loading aids are needed, which remain within the loading space and therefore take up valuable loading volume. Instead the individual piece goods are brought in layer form (two-dimensional) or block wise (three-dimensional) into the loading space and are deposited there whilst forming substantially self-stabilizing piece good stacks. As a result of the possibility of fully automatic loading of the loading space through lateral or frontal insertion of space shape-compressed piece goods arranged in layers into multiside-closed loading spaces, the costs associated with the loading process can be significantly reduced and in particular no labor force is required for transferring the piece goods into the loading space.

The installation according to the invention for loading a loading space with piece goods preferably have an at least partly deformable piece good surface has a feed device conventionally constructed as a linear conveyor system and on which the piece goods can be fed individually, together with a transfer device to which the piece goods can be transferred from the feed device and by means of which said piece goods can be brought into the interior of the loading space. According to the invention the installation is so further developed that at least one shaping means is provided through which the piece goods can be brought into a predeterminable form or shape. The shaping means determining or modifying the external space shape at least along a space axis of the piece goods to be loaded brings about a planned, external force introduction onto each individual piece good, which therefore assumes a compressed space shape.

It is obviously also possible to use the inventive installation for the loading of piece goods, whose surface has no or only slight deformability, such as is e.g. the case with packages. In this case the shaping means at least ensure a stabilization of the already present space shape of the individual piece goods, which once again have to be transferred by means of the transfer device and whilst maintaining their shape predetermined by the shaping means individually or groupwise with the aid of a loading means into the interior of the loading space which is at least open on one side. In the simplest case the shaping element is a plate.

According to a preferred embodiment the loading means with which the individual piece goods are brought into the interior of the loading space correspond to the shaping means within which the individual piece goods assume their desired compact space shape. The loading means also serve to bring the individual space shape-compact piece goods into the loading space for further deposition. Finally a separating unit is provided for separating the compact piece goods from the loading means, so that the piece goods are ultimately deposited in the loading space for forming piece good stacks.

In order to obtain a very compact space shape with respect to the individual piece goods to be loaded, prior to the actual transfer process into the loading space they are subject to a force, preferably along three space axes orthogonal to one another with the aid of suitable shaping means so that the height, length and width of the piece goods are compressed or deformed. Such a spatial compression preferably takes place in the succession described hereinafter:

With the aid of an at least zonally, preferably motor-driven linear conveyor the piece goods are individualized or singled, e.g. fed in along a conveyor belt in the are upstream of the loading space to be loaded. It is alternatively possible to construct the linear conveyor as an oblique plane along which the piece goods slide after one another.

The feed device constructed as a linear conveyor has an end section constructed as an accumulating conveyor and which has a stop face against which are conveyed the piece goods and as a result of the accumulating action which occurs strike against one another under the action of a force and form a piece good row. Along said piece good row all the piece goods undergo an initial compression along a first space axis, namely in the conveying direction of the conveyor belt.

In this state a transfer device ensures the transfer of the row-like, accumulated and uniaxially compressed piece goods into a shaping means, which preferably simultaneously serves as a loading means. The loading/shaping means preferably comprises a U-shaped longitudinal profile, whose length is dimensioned for the complete taking up of the piece good row received from the transfer device. The transfer of the piece good row into the U-shaped loading means takes place in such a way that the piece goods stacked on one another, as a result of their own weight, slide or drop between the upwardly open longitudinal profile arms of the loading means, so that the piece goods accumulated along a row as a result of the impact within the loading means are additionally deformed vertically and therefore orthogonally to the piece good row. In addition, the spacing between the two longitudinal profile arms of the loading means is dimensioned in such a way that all the piece goods between the loading means undergo mechanical pressure through the longitudinal profile arms, so that each individual piece good is deformed orthogonally to the vertical and to the axis along the piece good row. Thus, within the loading means there are piece goods compressed or compacted about all three space axes and which have a maximum compact piece good shape of an optimum nature with respect to the degree of filling.

The degree of deformation along each individual space axis or the force introduction necessary for the deformation can be individually set or chosen as a function of the piece good type, so that on the one hand it is ensured that each individual piece good assumes an optimum, minimum space shape, but that any damage to the piece good surface can be avoided. Such an individual setting of the force introductions on the individual piece goods can e.g. be brought about through the conveying speed along the linear conveyor, the height of fall with which the individual piece goods drop from the transfer device into the shaping means and the internal spacing between the longitudinal profile arms of the shaping means. Alternatively the piece good can be taken up by means of a handling unit, preferably an industrial robot and preferably with at least five axes, and deposited on the loading means.

For loading the loading space, which preferably has a rectangular loading bottom, a specific number of space good filled, U-shaped or plate-like loading means are juxtaposed in parallel with the aid of a loading unit, to be described in greater detail hereinafter with respect to the specific embodiment, where they are made ready and transferred to a vertically adjustable conveyor with which the plurality of loading means, together with the piece goods located therein can be brought in a substantially horizontal conveying direction into the interior of the loading space at least open on one side. Alternatively the vertically adjustable conveyor can be positioned below the loading space. All the juxtaposed loading means have an overall width which is the same or slightly smaller than the loading space width.

In the case that the loading space is completely empty, a first layer of compressed piece goods is brought into the loading space in such a way that the vertically adjustable conveyor vertically orients the loading means just above the loading space bottom. This takes place in sensor-assisted manner, so that manual assistance is also unnecessary for this setting process. If the loading space is already filled to a certain level, the sensor system, e.g. in the form of a light or ultrasonic sensor system, detects the present fill level with respect to which the conveyor with the filled loading means is vertically oriented.

The setting down of the piece good rows within the loading space takes place in such a way that the conveyor moves all the loading means on the latter horizontally into the interior of the loading space and comes into engagement with a separating unit, which is fitted to the conveyor at the sides of the 'loading space opening and has rake-like holding means, which can be frontally lowered into the loading means.

The loading means are then retracted from the loading space in opposition to the conveying direction and at the same time the holding means of the separating unit prevent the piece good rows inside the individual loading means from being extracted together with the latter from the loading space again. Instead the individual piece goods are shoved out of the loading means along a piece good row relative to the particular loading means using a "cake server principle" and are consequently deposited on the loading space bottom or floor. By omitting the external mechanical pressure acting on the piece goods within the loading means the piece goods brought out of the latter expand slightly as a result of their own weight and inherent deformability, so that they come into mutual contact in a layer-like arrangement and are able to stabilize one another.

The remaining loading process takes place in the above described, layer-like manner, i.e. through the successive transfer of individual piece good layers into the loading space there is a corresponding increase in the piece good stack height until a gap present for the top layer within the loading space is filled with a final layer consisting solely of piece goods.

As a result of the inventive, planned, external force action on the piece goods to be loaded up to the instant where the individual piece goods are deposited in layer form for forming piece good stacks within the loading space it is ensured that the piece goods have an optimum, stackable space shape, which utilizes the available loading volume substantially without any formation of space-wasting gaps between two adjacent piece goods. The reduction of the gaps within the stack pattern of the piece goods also leads to an increase in the friction surfaces between the individual piece goods, so that the frictional force acting between the piece goods is increased and at the same time the stability of the entire piece good stack deposited within the loading space is improved.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

Without restricting the general inventive concept, the invention is described hereinafter with the aid of embodiments and with respect to the attached drawings, wherein show.

DETAILED DESCRIPTION OF THE PREFERRED EMBODIMENT

Figure 1:
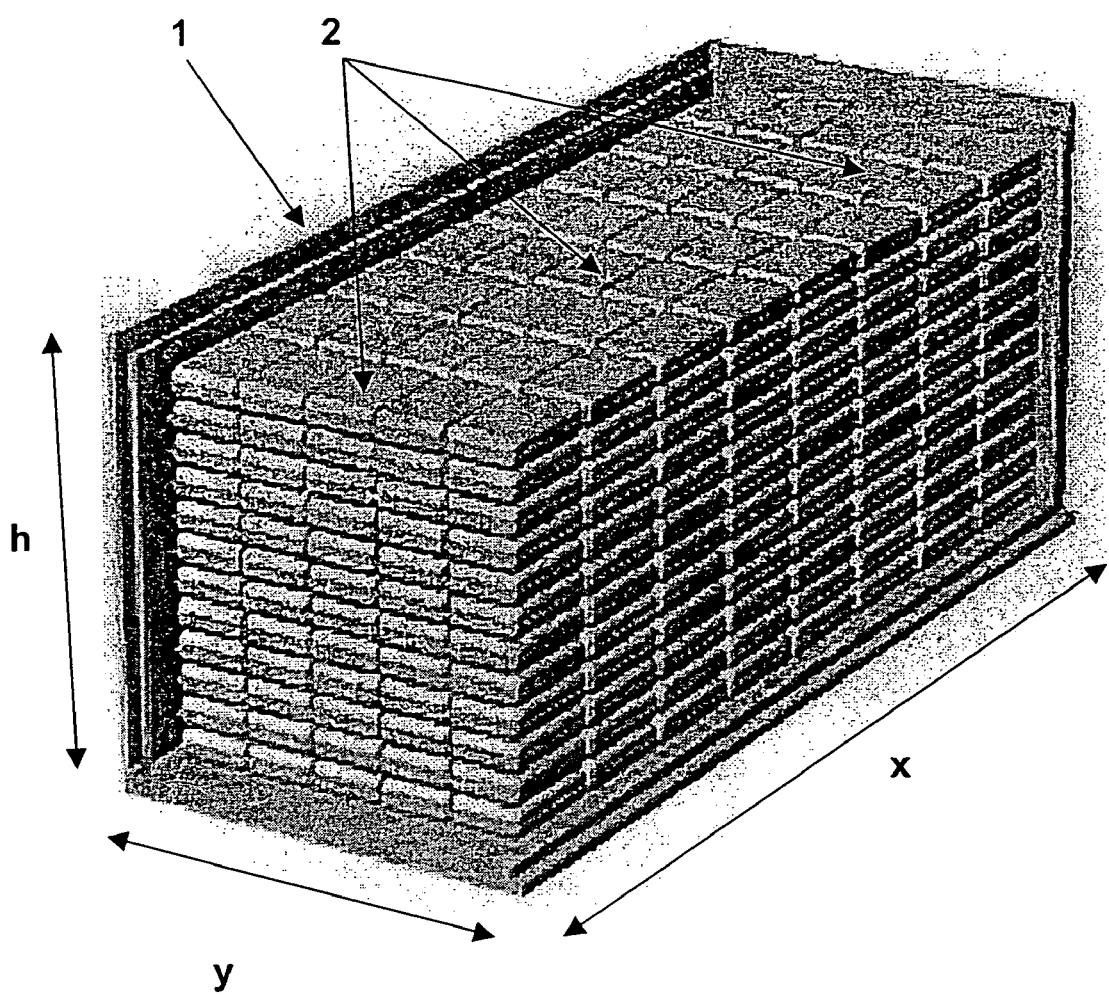
FIG. 1 is a view showing the loading space situation with layer-like piece good stacks.

Referring to the drawings in particular, the object of the installation according to the invention is to bring about an automatic, filling level-optimized, frontal or lateral loading of flexible goods, preferably sand, cereal or sugar sacks, in a multiside-closed loading space. To bring about a maximum space utilization within the loading space, prior to loading the piece goods are brought into an optimum space shape and/or orientation for loading purposes. The stack-like layer patterns producible in this way within the loading space and as can be gathered from FIG. 1, have a minimum of gaps between the stack-like piece goods. It is possible to implement with such preshaped piece goods the palletizing pattern shown in FIG. 1 with x piece goods in the loading space depth, y piece goods in the loading space width and z piece goods in the loading space height. The values x, y and z result from the loading space 1 and the piece good dimensions, whilst taking account of or correspondingly using their deformability. The loading space 1 in FIG. 1 is constructed so as to be open on three sides to make it easier to see the layer and stack-like piece goods. In general, there is in fact a loading space which is accessible from the front or longitudinal side.

Figure 2:
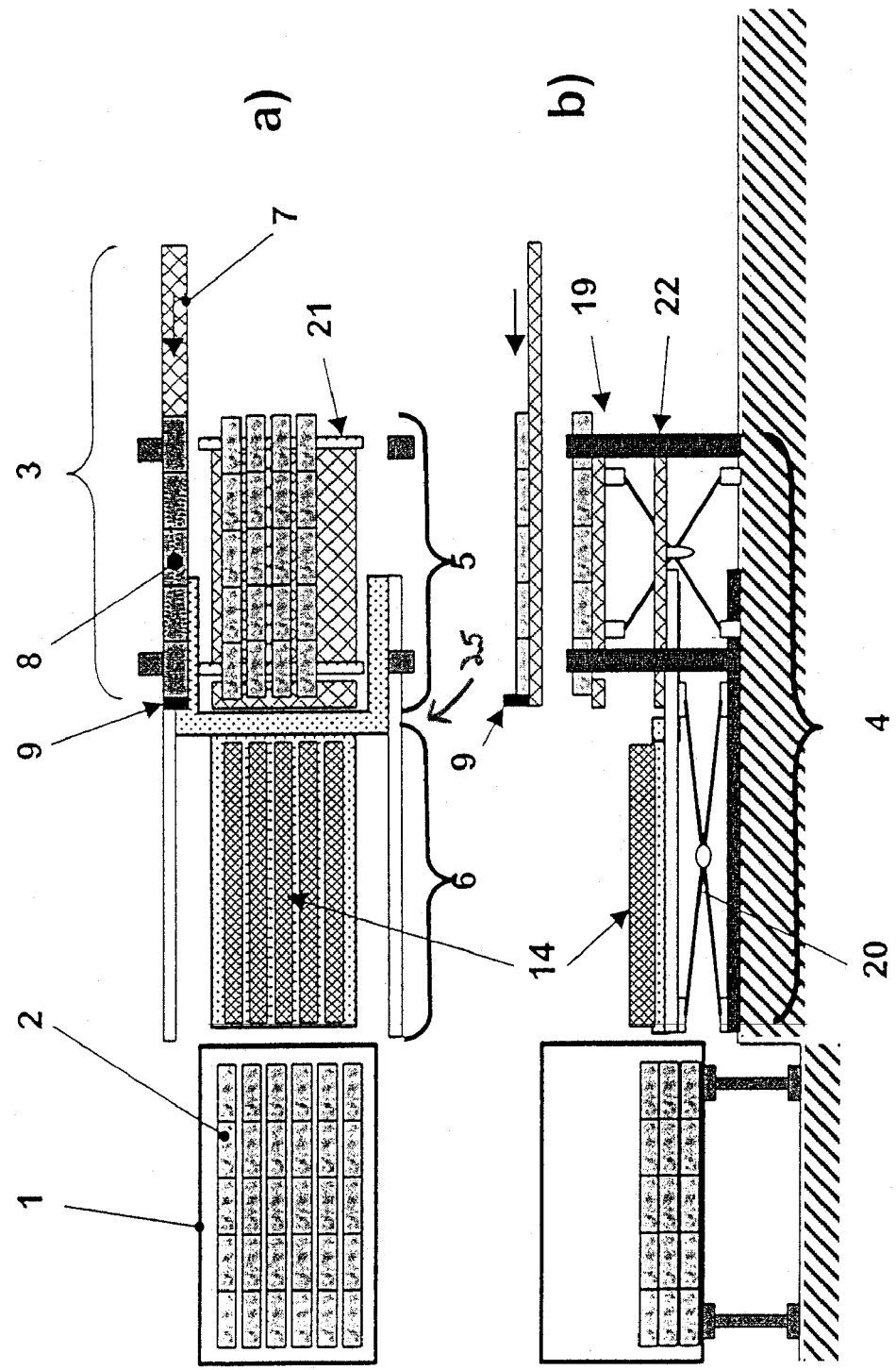
FIG. 2 is a diagrammatic overall view of the loading arrangement.

For implementing the aforementioned object the installation shown in FIG. 2 in an overall view, in plan view in FIG. 2a and side view in FIG. 2b. It is a matter of loading in filling level-optimized manner with piece goods 2 the loading space 1 using a loading installation comprising a feed device 3 and a transfer device 4. The latter has a loading unit 5 and a vertically adjustable conveyor 6, which is fitted to a slide system 25 movable in a substantially horizontal conveying direction. As an alternative to the vertically adjustable conveyor 6, the entire loading space can be moved by means of a vertically adjustable unit.

The piece goods 2 to be loaded are individually fed in by means of the feed device 3 (cf. also FIGS. 3a and 3b), which has a motor-driven linear conveying unit 7. At the end of the conveying section of the feed unit 3, the piece goods are accumulated into a row by means of an accumulating conveyor 8. The accumulating conveyor 8 preferably comprises a non-motor-driven roller conveyor and has at the end a stop face 9 against which strikes the first piece good in the conveying direction. As a result of the accumulation of numerous piece goods 2 along a row pulsating and compressive forces act in the conveying direction between the individual piece goods 2, which are consequently deformed in the conveying direction.

As will become apparent hereinafter, the length of the accumulating conveyor 8 and the piece good row which can be produced therewith are dependent on the length x of the loading space to be loaded (cf. FIG. 1). Alternatively the piece good can be taken up by means of a handling unit, preferably an industrial robot and set down directly on the loading means.

Figure 3:
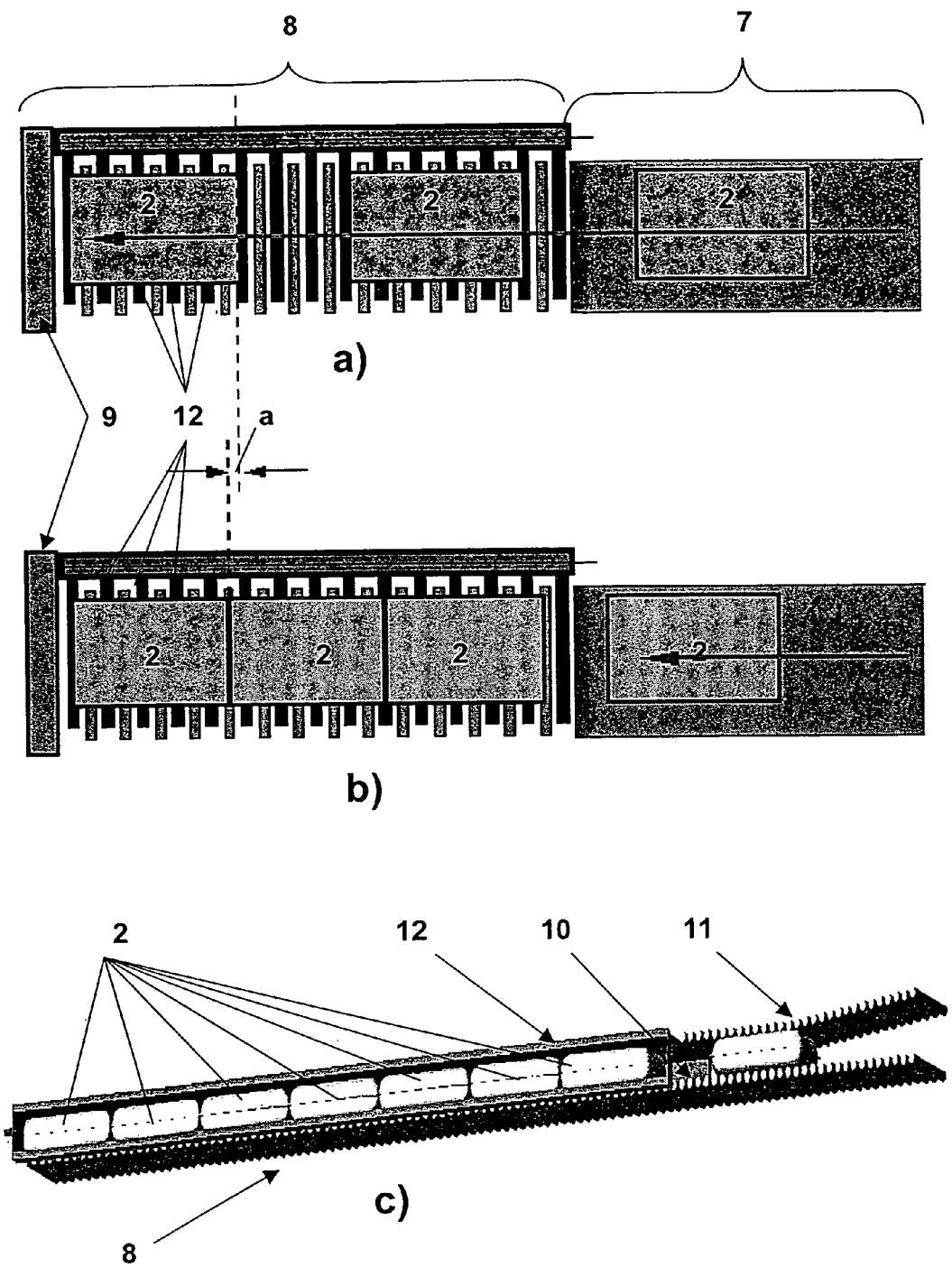
FIG. 3a is a representations of the feed device.
FIG. 3b is another representations of the feed device.
FIG. 3c is another representations of the feed device.

FIG. 3c perspectively shows an alternative embodiment of an accumulating conveyor 8, which is able to take seven individual piece goods 2 in a row. Before entering the accumulating conveyor 8 there is an upper roller arrangement 11 parallel to the lower conveyor belt plane 10 through which the individual piece goods 2 are already compressed along their thickness to a predetermined minimum.

If the orientation of the piece goods has to be modified for achieving the optimum filling density, the accumulating conveyor 8 also has a U-shaped transfer device 12, between whose side arms the individual, accumulated piece goods 2 are compressed to a minimum along their thickness. FIG. 3c shows the transfer device in perspective. The lower sidearm of the transfer device 12 in FIG. 3c has a finger-like projection and projects with its finger elements 12' into the gaps of the roller arrangement of the accumulating conveyor 8. This can also be gathered from FIGS. 3a and b, which reveal the spacing a between the finger elements 12' and the rollers of the accumulating conveyor 8. As a result of the finger-like construction of at least one side arm of the transfer device 12 it is possible to tilt the latter relative to the roller plane of the accumulating conveyor 8.

Figure 4:
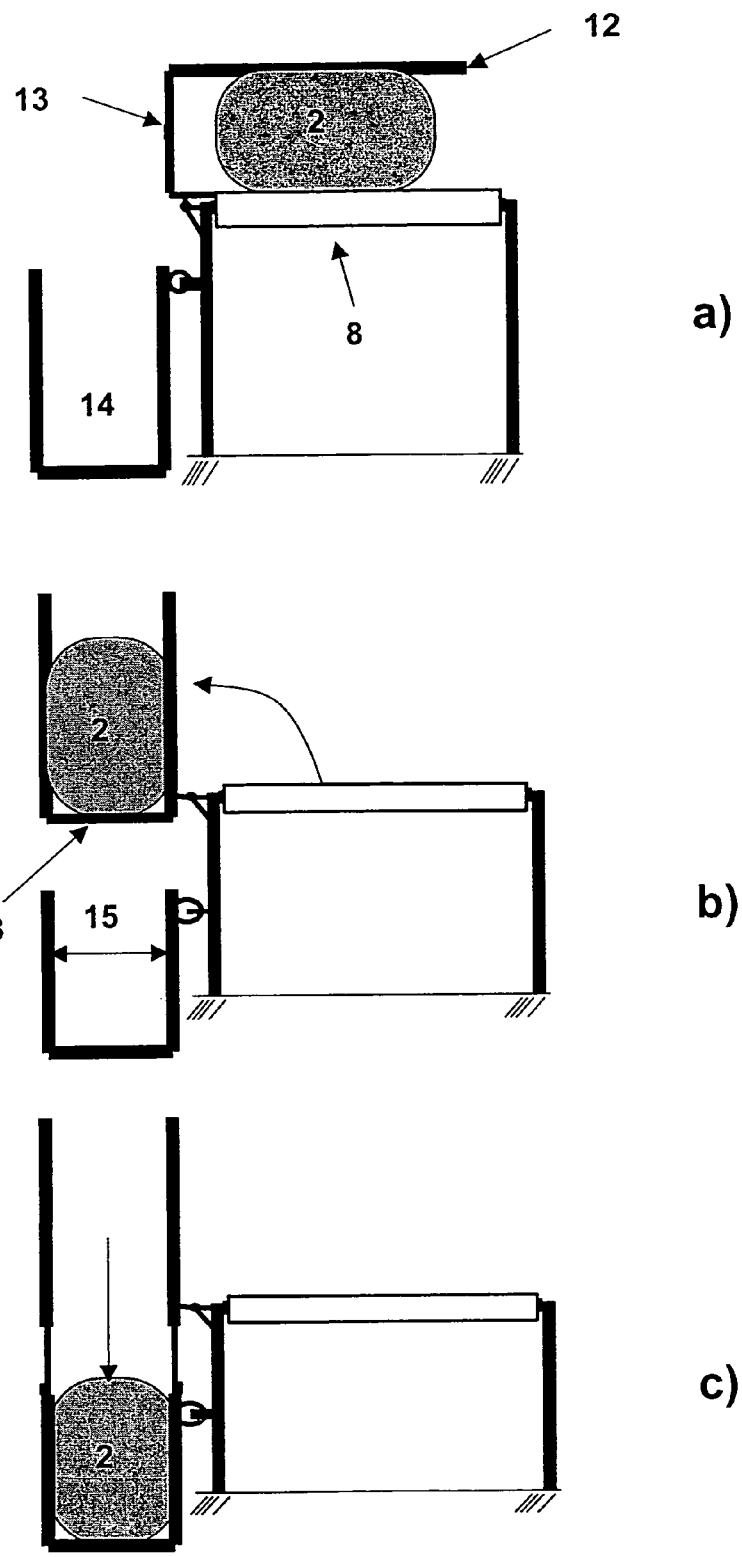
FIG. 4a is a diagrammatic representation of the transfer device.
FIG. 4b is another diagrammatic representation of the transfer device.
FIG. 4c is another diagrammatic representation of the transfer device.

When the accumulating conveyor 8 is completely filled with piece goods to be loaded, it is necessary to transfer to the loading unit 5 the piece goods deformed in the conveying direction and along their thickness. An embodiment of the necessary transfer mechanism is shown in FIGS. 4a–c. FIG. 4a is a cross-sectional representation of an accumulating conveyor 8 filled with piece goods 2 and having a U-shaped transfer device 12, provided with a closing flap system 13. Alongside the accumulating conveyor 8 is provided an empty shaping means 14 into which the lined up piece goods 2 must be transferred for the further loading process. According to FIG. 4b the transfer device 12 tilts by 900 with closed flap system 13 and in aligned manner over the shaping means 14 constructed as a U-shaped longitudinal profile. In FIG. 4c the flap system 13 is opened, so that the lined up piece goods 2 drop in an accelerated manner as a result of their own weight into the shaping means 14 and then in the drop direction undergo a further shape compression. The internal spacing of the side walls 15 of the shaping means 14 also helps to compress the thickness of the piece goods 2, so that the piece goods now compressed in all three directions in space by means of the shaping means 14 are kept in a predeterminable, optimized compressed shape.

If the length-related necessary extent of the piece good row could not be reached by the preceding accumulating conveying, the length of the piece good row within the shaping means 14 can be brought to a desired amount by means of a not shown, displaceable stop in the longitudinal direction of the shaping means.

Figure 5:
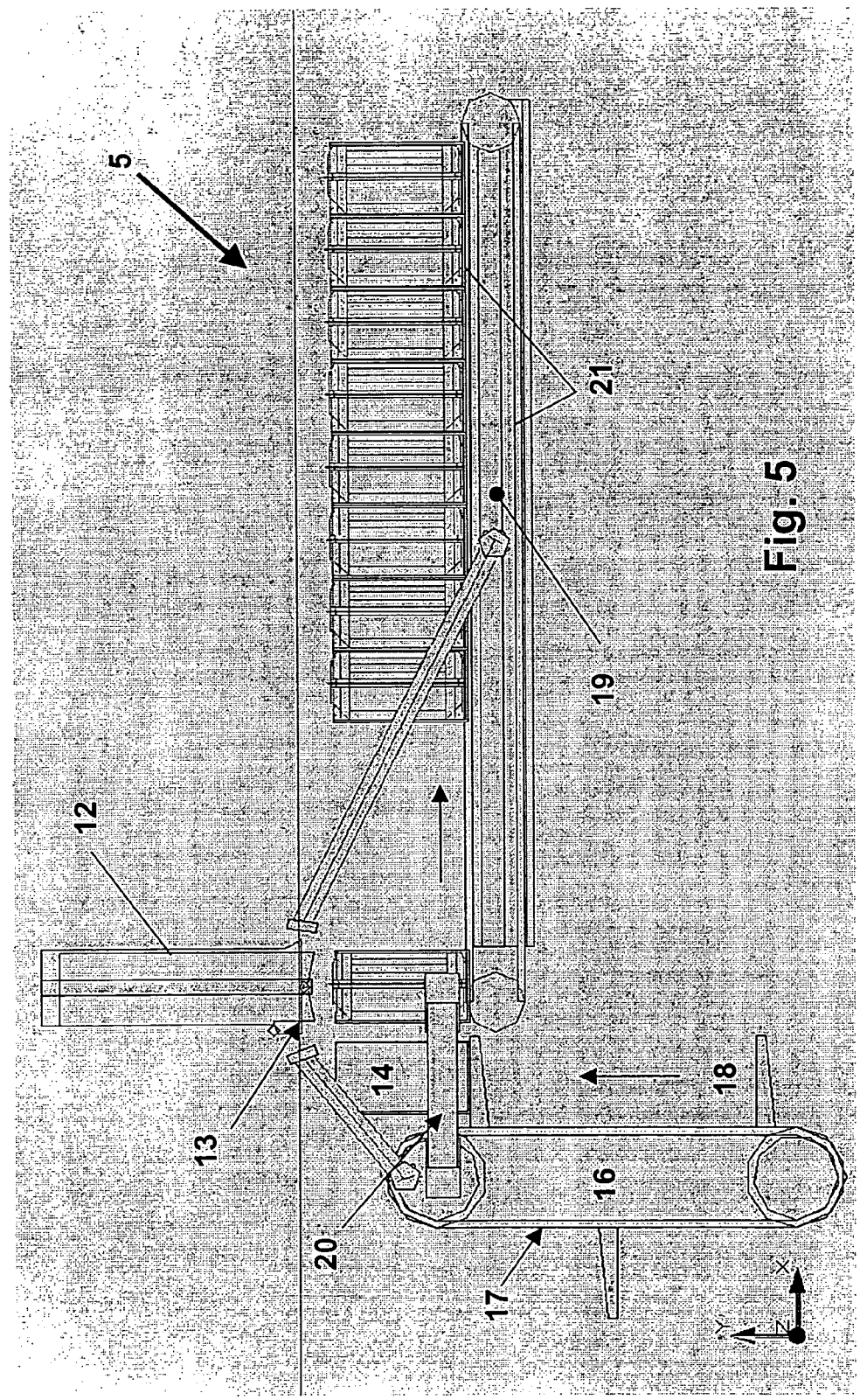
FIG. 5 is a diagrammatic representation of the loading unit.
Figure 6:
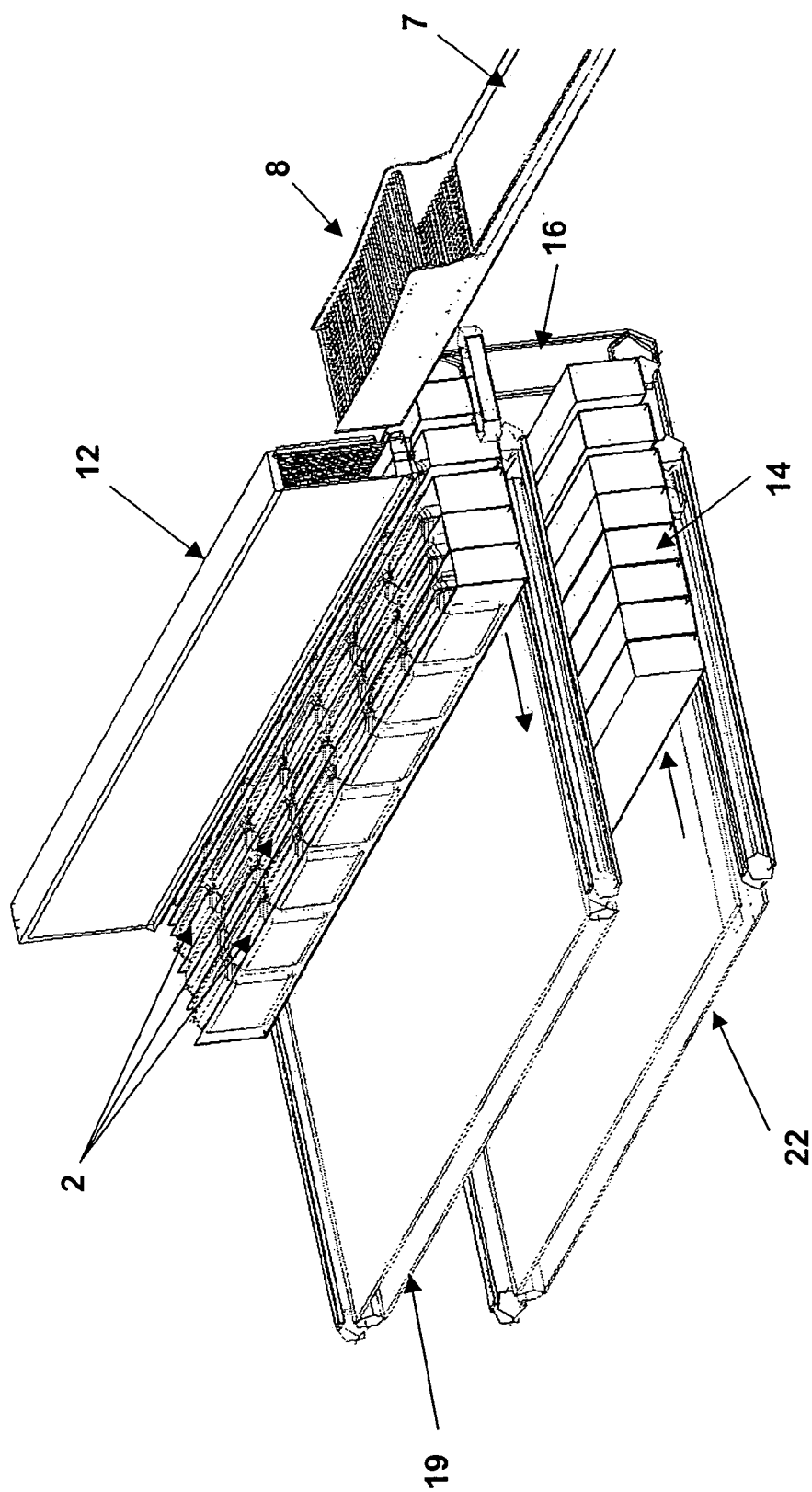
FIG. 6 is a diagrammatic representation of the making ready unit.

The shaping means 14 filled with a piece good row then has to be transferred to the loading unit 5 (cf. also FIG. 2). This function is fulfilled by the making ready unit 16, diagrammatically shown in FIG. 5. The making ready unit 16 is positioned laterally of the loading unit 5 and has a conveyor belt 17 with retaining elements 18 on which are positioned empty shaping means 14 level with an upper working plane 19 of the loading unit 5 and directly below the transfer device 12. An empty shaping means 14 raised to the height of the upper working plane 19 of the loading unit 5 is moved by means of a linear conveyor 20 directly below the opening flap system 13 of the transfer device 12. The above-described, piece good-loaded shaping means 14 then pass via a cyclically operable conveyor system 21 onto the upper plane 19 of the loading unit 5. The empty shaping means 14 made ready for filling by the making ready unit 16 are made available from a lower working plane 22 of loading unit 5, as can in particular be gathered from FIG. 6.

The lower working plane 22 of the loading unit 5, like the upper working plane 19, provides a cyclically operable conveyor system 23 conveying empty shaping means 14 in the direction of the making ready unit 16. Both working planes 19 and 22 have a fixed vertical, mutual spacing. The lower working plane 22 is used for the taking up and buffer storing of empty shaping means 14, whereas the upper working plane 19 of loading unit 5 is used for the completion and making ready of a plurality of parallel, juxtaposed shaping means loaded with shaped piece goods 2. The maximum number of shaping means 14 which can be juxtaposed along the upper/lower working plane of the loading unit 5 also corresponds to the number y of piece good stacks to be deposited in juxtaposed manner within the loading space (cf. FIG. 1).

When the upper working plane 19 of loading unit 5 is completely filled with shaping means 14 loaded with piece goods 2, the complete layer of shaping means 14 passes via a transfer mechanism onto the vertically adjustable conveyor 6, which can be continuously vertically raised or lowered by means of a lifting table 20 (cf. FIG. 2). At the time of transfer of the shaping means 14, the conveyor 6 is precisely at the same height as the upper working plane 19.

The shaping means 14 the conveyor 6 and which are preferably made from U-shaped longitudinal profiles of light-gauge sheet steel, consequently have a minimum inherent rigidity and have at least one open front side, which according to FIG. 2 faces the loading space, so that the piece goods contained in the individual shaping means can be deposited layer wise in the loading space in the manner to be described hereinafter. At this point it is indicated that the shaping means 14 can also be used as loading means and are employed for directly transferring the piece goods into the loading space. By means of the slide system 25 shown in FIG. 2, following a corresponding vertical orientation relative to the actual, upper depositing plane within the loading space 1, the conveyor 6 conveys the piece good-filled shaping means 14 completely to just above the upper depositing plane into the loading space 1. The vertical positioning of the conveyor takes place with the aid of a sensor system which detects the upper depositing plane within the loading space. Preferred sensors are based on optical, light or ultrasonic sensors. Following corresponding vertical positioning the shaping means 14 used as loading means are moved completely in layerwise, horizontal manner into the loading space.

Figure 7:
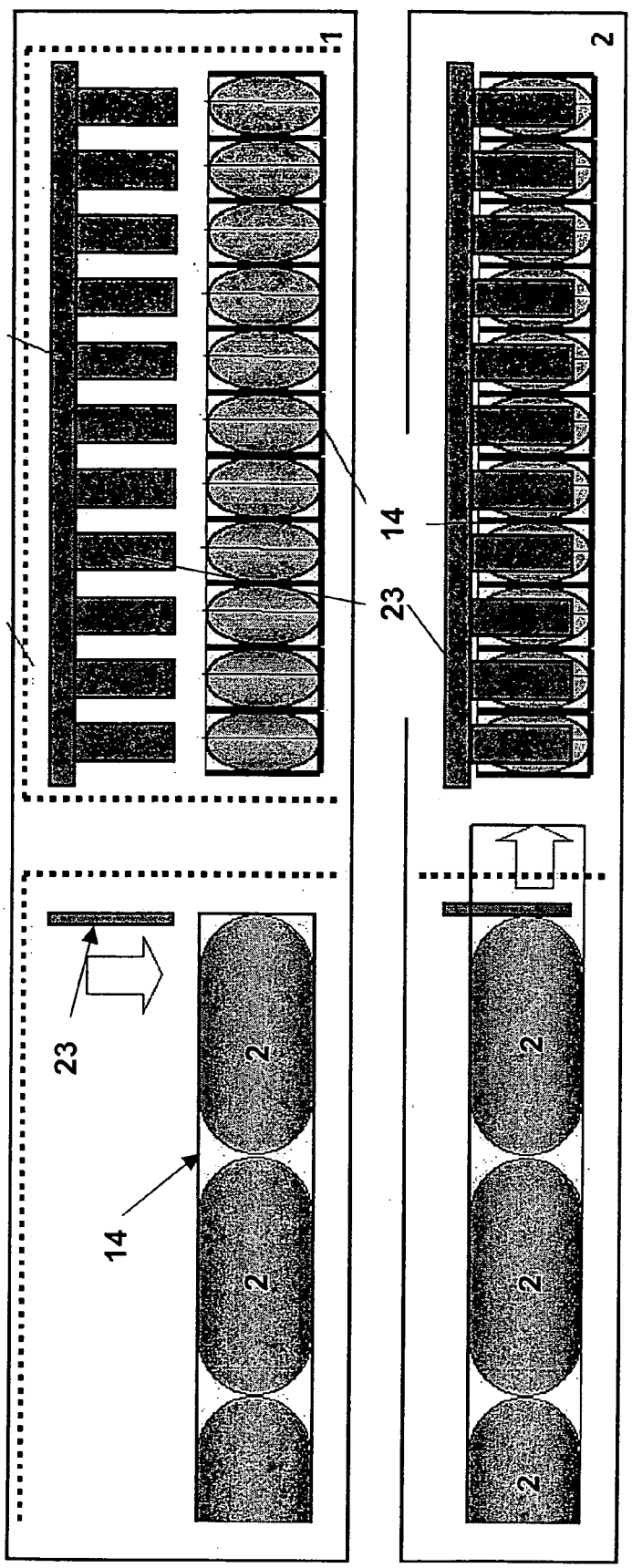
FIG. 7a is a representation of the separating unit.
FIG. 7b is another representation of the separating unit.

FIG. 7a is a diagrammatic side view of a layer of shaping means 14 filled with piece goods 2 within the loading space 1. To the sides of the right-hand, open loading space opening is provided a separating unit 23 having rake-like holding means 24, which are vertically lowered from above and in frontal manner into the shaping means 14 (see top and bottom representation in FIG. 7a). FIG. 7b is a front view of the separating unit 23 and of the shaping means 14 loaded with piece goods 2 within the loading space 1. The lowered position of the separating unit 23 is shown in the lower representation of FIG. 7b. Then the individual shaping means 14 are extracted from the loading space 1 and the piece goods 2 are kept fixed within the loading space 1 by the holding means 24.

The emptied shaping means 14 pass via conveyor 6 into the lower working plane 22 of the loading unit 5 where, as described hereinbefore, they are fed to the making ready unit 16. This situation is shown in FIG. 2, where the emptied shaping means 14 are located on conveyor 6 for further transfer to the lower working plane 22 of loading unit 5.

Loading spaces can be loaded in filling level-optimized manner with the above-described installation.

As opposed to the two-stage loading method described hereinbefore, in the loading method according to the invention no loading aids remain within the loading space, so that greater space utilization can be achieved. Another advantage results from the reusability of the individual shaping means used as loading means. Thus, there are no additional costs associated with loading aids.

It is also possible using the loading installation according to the invention to load smaller loading spaces compared with the shaping/loading means dimensions described with piece goods. In this case there is merely a partial filling of the shaping means with piece goods or only a limited number of shaping means is juxtaposed on the loading unit. Thus, the loading system can be adapted in modular manner to a plurality of loading space geometries without expensive design modifications to the actual loading system being necessary.

While a specific embodiment of the invention has been shown and described in detail to illustrate the application of the principles of the invention, it will be understood that the invention may be embodied otherwise without departing from such principles.

The invention claimed is:

1. A device for loading shapeable piece goods to a loading space, the device comprising:
    a feed means for feeding piece goods individually or groupwise;
    a loading space having an opening on at least one side;
    a shaping means for receiving the piece goods, whereby said shaping means establishes the piece goods in a predeterminable shape or orientation;
    a transfer means for transferring the piece goods from said feed means into interior of said loading space, said transfer means having a forklike construction, said transfer means at least partly bilaterally enclosing the piece goods on an accumulating conveyor, said transfer means transferring the piece goods into said shaping means via a tilting process and/or a translatory process; and
    a separating means for separating the piece goods from said shaping means and depositing said piece goods into said loading space.

2. A device according to claim 1, wherein said transfer means is a vertically adjustable conveyor on which said shaping means with the piece goods is linearly movable in a substantially horizontal conveying direction into the interior of said loading space.

3. A device according to claim 1, wherein said loading space is located on a lifting table.

4. A device according to claim 3, wherein said transfer means is a loading unit directly juxtaposed with a vertically adjustable conveyor, said loading unit comprising at least two vertically superimposed working planes each working plane comprising a cyclically operable conveyor system for loading or unloading the working planes with shaping means which are empty or filled with piece goods.

5. A device according to claim 1, wherein said separating unit is in engagement with at least one piece good of the piece goods located within said shaping means and wherein said shaping means is linearly movable counter to the conveying direction relative to the separating unit.

6. A device according to claim 1, wherein said feed means is a motor-driven linear conveyor and has an accumulating conveyor as an end section.

7. A device according to claim 6, wherein said accumulating conveyor comprises a stop face oriented transversely to the conveying direction of the feed device.

8. A device according to claim 6, wherein said accumulating conveyor provides a sliding or rolling plane for the piece goods, said sliding or rolling plane being flush or lowered with respect to the bearing surface of the linear conveyor.

9. A device according to claim 8, wherein a plurality of shaping means filled with piece goods are transferred from the first working plane of the loading unit to the vertically adjustable conveyor, wherein said shaping means are arranged in a parallel, juxtaposed manner in the conveying direction, wherein the total width of all the juxtaposed shaping means is the same or slightly smaller than the loading space width and in each case the length of the shaping means is slightly smaller than the length of the loading space.

10. A device according to claim 1, further comprising a making ready unit for shaping means that contain no piece goods, said making ready unit cyclically moving forward empty shaping means and orienting the same with respect to said transfer means.

11. A device according to claim 1, wherein said shaping means is in the form of a U-shaped longitudinal profile with at least one open front side.

12. A device according to claim 11, wherein the U-shaped longitudinal profile has two spaced longitudinal profile arms with a clearly defined mutual spacing.

13. A device according to claim 12, wherein the spacing between the two longitudinal profile arms is such that a piece good located within said shaping means is given a mechanical pressure on its surface by the two longitudinal profile arms and wherein said loading means has a length corresponding to the length of the accumulating conveyor.

14. A device according to claim 1, wherein said transfer means is a vertically adjustable conveyor comprising at least one sensor system for detecting an actual fill level of the loading space filled with piece goods and a control unit for vertically moving the conveyor to the actual fill level prior to the transfer of the piece goods into the loading space.

15. A device according to claim 1, wherein said separating means is connected to a vertically adjustable conveyor and has holding means for fixing the piece goods within said loading space when the piece goods are separated from the shaping means counter to the conveying direction during the movement of the conveyor.

16. A device according to claim 15, wherein said separating means is of a rake-like construction, said holding means being prongs, said prongs being lowered within said shaping means.

17. A device according to claim 1, wherein said shaping means receives bulk material such as cereals, sugar or sand.

18. A device according to claim 1, wherein said feeding means presses the piece goods together along a piece good row such that the piece goods are compressed along at least one axis oriented perpendicular to the extension of the piece good row.

19. A device for loading shapeable piece goods to a loading space, the device comprising:
    a feed means for feeding piece goods, said feed means being a motor-driven linear conveyor having an accumulating conveyor as an end section;
    a loading space having an opening on at least one side;
    a shaping means for receiving the piece goods, whereby said shaping means establishes the piece goods in a predeterminable shape or orientation;
    a transfer means for transferring the piece goods from said feed means into interior of said loading space, said transfer means comprising a loading unit and a vertically adjustable conveyor, wherein a plurality of shaping means filled with piece goods are transferred from a first working plane of a loading unit to a vertically adjustable conveyor, said shaping means being arranged in parallel to a conveying direction such that the total width of all adjacent shaping means is the same or slightly smaller than said loading space width and the total length of each adjacent shaping means is slightly smaller than the length of said loading space; and
    a separating means for separating the piece goods from said shaping means and depositing said piece goods into said loading space.

20. A device according to claim 19, wherein said accumulating conveyor provides a sliding or rolling plane for the piece goods, said sliding or rolling plane being flush or lowered with respect to the bearing surface of the linear conveyor.

21. A device for loading shapeable piece goods to a loading space, the device comprising:
    a feed means for feeding piece goods;
    a loading space having an opening on at least one side;
    a shaping means for receiving the piece goods, whereby said shaping means establishes the piece goods in a predeterminable shape or orientation;
    a transfer means for transferring the piece goods from said feed means into interior of said loading space; and
    a separating means for separating the piece goods from said shaping means and depositing said piece goods into said loading space, said separating means being connected to a vertically adjustable conveyor, said separating having holding means for fixing the piece goods within said loading space when the piece goods are separated from said shaping means counter to the conveying direction during movement of said conveyor.

* * * * *